United States Patent [19]

Baldoni, II et al.

[11] Patent Number: 4,686,156

[45] Date of Patent: Aug. 11, 1987

[54] COATED CEMENTED CARBIDE CUTTING TOOL

[75] Inventors: J. Gary Baldoni, II, Walpole; Charles D'Angelo, Southboro, both of Mass.

[73] Assignee: GTE Service Corporation, Waltham, Mass.

[21] Appl. No.: 786,734

[22] Filed: Oct. 11, 1985

[51] Int. Cl.$^4$ .......... B22E 3/00; C23C 11/00
[52] U.S. Cl. .......... 428/698; 428/469; 428/699; 428/472
[58] Field of Search .......... 428/469, 472, 698, 699

[56] References Cited

U.S. PATENT DOCUMENTS

| | | |
|---|---|---|
| 2,113,353 | 12/1937 | McKenna . |
| 3,073,717 | 1/1963 | Pyle et al. .......... 428/698 X |
| 3,874,900 | 4/1975 | Post . |
| 3,964,937 | 6/1976 | Post et al. .......... 428/698 X |
| 4,018,631 | 4/1977 | Hale .......... 428/698 X |
| 4,035,541 | 7/1977 | Smith . |
| 4,101,703 | 7/1978 | Schintlmeister . |
| 4,150,195 | 4/1979 | Tibioka . |
| 4,162,338 | 7/1979 | Schintlmeister . |
| 4,237,184 | 12/1980 | Gonseth et al. .......... 428/698 X |
| 4,357,382 | 11/1982 | Lambert . |
| 4,422,169 | 4/1984 | Graham . |
| 4,431,431 | 2/1975 | Sarin . |
| 4,450,205 | 5/1984 | Itaba . |

FOREIGN PATENT DOCUMENTS 1601224  5/1978  United Kingdom .

OTHER PUBLICATIONS

W. S. Williams, Transactions of The Metallurgical Society of AIME, 236, 211–216, (1966).
Encyclopedia of Chemical Technology, vol. 23, 273–309, Article by R. Komanduri.

Primary Examiner—Nancy A. Swisher
Attorney, Agent, or Firm—Ernest V. Linek

[57] ABSTRACT

The present invention is directed to a triple coated cemented hard metal carbide product in which a cemented metal carbide substrate is coated with, first, a metal carbide coating to promote coating adherence to the substrate, secondly, a metal nitride or carbonitride coating to promote crater wear resistance and, thirdly, a metal carbide outer layer to promote flank flank wear resistance in order to protect the cemented metal carbide substrate from corrosive atmosphere and abrasion due to frictional flank wear.

15 Claims, 1 Drawing Figure

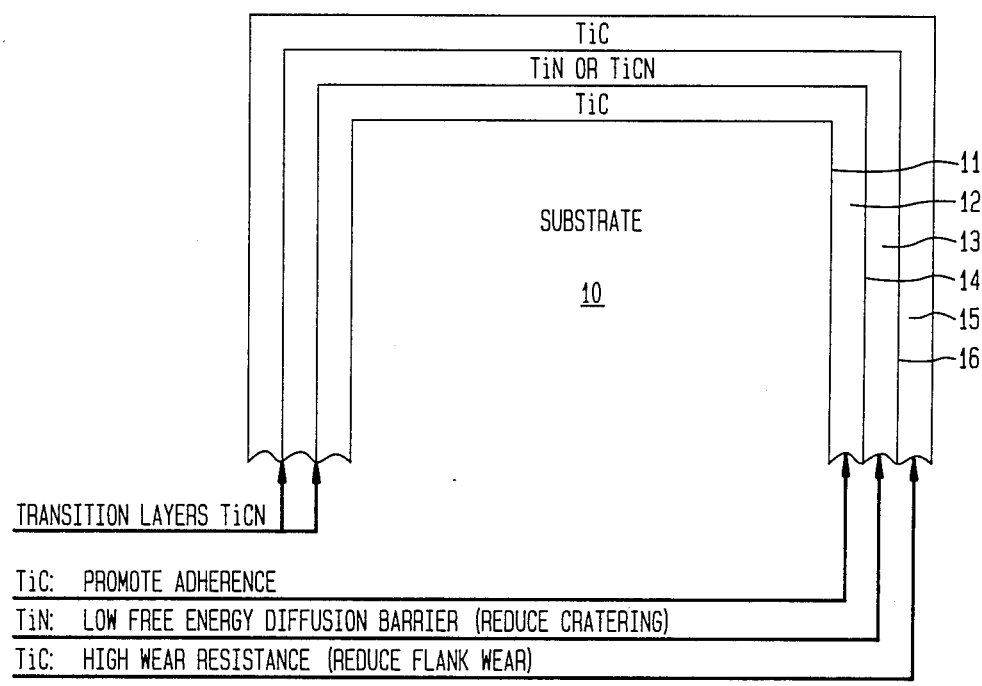

COATED CEMENTED CARBIDE CUTTING TOOL

FIELD OF THE INVENTION

This invention relates to cutting tools and cutting tool inserts. More particularly, it is concerned with cemented carbide cutting tools and cutting tool inserts having a plurality of refractory coatings thereon.

BACKGROUND OF THE INVENTION

Cemented carbide materials are well known for their unique combination of properties of hardness, strength, and wear resistance and have accordingly found extensive use in mining tool bits, metal cutting and boring tools, metal drawing dies, wear resistant machine parts, and the like. See for example, McKenna, U.S. Pat. No. 2,113,353.

It is known that the wear resistance of cemented carbide materials may be enhanced by the application of thin coatings of a highly wear resistant material such as titanium carbide or aluminum oxide. See for example, Lambert et al., U.S. Pat. No. 4,357,382 and Tobioka et al., U.S. Pat. No. 4,150,195. The most important factors influencing wear during machining are:
1. Mechanical abrasion;
2. Diffusion and reaction between the material machined and the cutting tip at higher cutting temperatures; and
3. Thermal cracking and chipping.

Economic pressures for higher productivity in machining applications are placing increasing demands upon the performance of cutting tool materials. To achieve high productivity in machining, a tool must be able to cut at high speeds. At cutting speeds exceeding 1500 surface feet per minute (sfpm), the high temperature strength and chemical inertness of a cutting tool material become more and more important. The usefulness of cemented carbide cutting tool materials (the predominant material used in cutting tools today) has been extended to applications requiring cutting speeds of about 1500 sfpm by coating such tools with aluminum oxide. For cutting speeds in excess of 1500 sfpm, cemented carbide tools encounter problems associated with loss of strength and tool nose deformation, which affect dimensional tolerance in the workpiece and contribute a shorter tool life.

Indexable cutting tool inserts coated with thin surface layers ocf hard materials up to a few micrometers thick are also established in the market and their importance is steadily increasing. Such inserts are principally used for turning and milling of steel and cast iron.

Two main advantages arise from the use of coated inserts: the increase in tool life, which can be several times that of uncoated inserts, and the possibility of using increased cutting speeds and thereby reducing machining time.

Cutting tools are typically coated with either single or multiple layers. Most multiple layer tools are coated first with TiC which chemically interacts with the substrate to promote adherence and subsequently with TiN for crater wear resistance. Some flank wear resistance is sacrificed with the softer outer layer to gain improved crater wear resistance. A first or single layer of TiN has generally proven unsuccessful because the higher thermal expansion of TiN compared to TiC, $9.4 \times 10^{-6}$°C.$^{-1}$ and $7.4 \times 10^{-6}$ C.$^{-1}$ respectively, creates much higher residual stresses in the TiN coating when the coated tools are cooled from the CVD processing temperature (ca. 1000° C.) and the coating tends to be poorly adhered to the substrate.

The first coated inserts, which were introduced about fifteen years ago, were coated with TiC. After this, a succession of single-layer coatings of TiC, TiN or HfN were offered. The introduction of multilayer coatings brought about a further increase in wear resistance. These coatings either consist of TiC or Ti(C,N) with a thin surface layer of $Al_2O_3$ or alternatively comprise a succession of layers made up of TiC adjoining the base material, then a series of titanium carbonitrides and finally a surface layer of TiN.

Since TiC has a higher hardness than TiN, 2900 Kg/mm$^2$ and 2000 Kg/mm$^2$ respectively, TiC coated tools tend to have higher flank wear resistance than TiN coated tools. However, TiN has a lower free energy of formaton than TiC, about 70 Kcal/gm-atm. and about 35 Kcal/gm-atm. respectively, and therefore a TiN coating is a more effective diffusion barrier and is more resistant to chemical wear, which causes crater wear, compared to a TiC coating.

U.S. Pat. Nos. 4,101,703 and 4,162,338 (Schintlmeister) describe coated cemented carbide cutting elements wherein the coating is a multilayer composition of at least two different wear resistant materials and includes at least two elements of the group consisting of carbon, nitrogen, boron and silicon in chemical combination with titanium. The coated materials are reported to exhibit superior wear resistance, especially in use for cutting steel and/or cast iron.

U.S. Pat. No. 4,035,541 (Smith et al.) describes a triple coated cemented metal carbide product. The triple coating is created by taking the metal carbide substrate material and (1) putting a first coating on the substrate, which comprises a carbide of a metal selected from the group of titanium, zirconium, hafnium, vanadium, niobium or tantalum; (2) putting a second coating on top of the first coating, the second coating comprising a metal carbonitride; and (3) putting a third and final coating over the second coating, the third coating comprising a metal nitride coating. It is reported that this arrangement enhances the hardness and wear life of the cemented metal carbide substrate material.

U.K. Pat. No. 1,601,224 (Lardner et al.) describes a cutting insert material provided with a first thin layer of titanium nitride, followed by a thin layer of titanium carbide, followed by an outer layer of titanium nitride or titanium carbonitride, having a thickness of up to 3 $\mu$m.

SUMMARY OF THE INVENTION

The present invention relates to a hard, wear resistant multilayer coating of nonuniform composition in adjoining layers, comprising at least two different wear resistant materials.

The present invention also encompasses articles with such coatings on hard material bases or substrates of the type described hereinafter, and especially cemented carbide substrates having an adherent coating that contains at least two different wear resistant materials and includes carbon and nitrogen in chemical combination with titanium.

This invention also encompasses a method of making the aforesaid articles by deposition onto substrates from reactive gaseous mixtures under controlled reaction conditions, including the composition of the gaseous mixtures.

Other aspects of the invention involve one or more of such features as the structure of the multilayer article and the thickness and disposition or location of its layers.

BRIEF DESCRIPTION OF THE DRAWING

The FIGURE is a schematic depiction of the multilayer coating of the present invention.

DETAILED DESCRIPTION OF THE PREFERRED EMBODIMENTS

The present invention is directed to multilayer coatings for cutting tools, which coatings comprise three main layers; (a) a first layer selected from carbides of the metals of Groups IVB and VB of the periodic table of elements, towit; Ti, Zr, Hf, V, Nb and Ta; (b) a second layer selected from nitrides or carbonitrides of the metals of Groups IVB and VB of the periodic table of elements; and (c) a third layer selected from carbides of the metals of Groups IVB and VB of the periodic table of elements. Such coatings range in thickness from about 0.01 to 10 microns each, for an overall thickness of from about 0.03 to 30 microns. Such coatings improve wear resistance of tools coated therewith, especially crater wear and flank wear.

This invention preferably relates to improving the flank wear resistance of a coated tool with a three layer coating consisting of a TiC first layer and a TiN intermediate layer with the addition of a third layer consisting of TiC. The first (inner most, i.e., adjacent to the substrate) TiC layer promotes coating adherence, the intermediate TiN layer promotes crater wear resistance and the outer TiC layer promotes flank wear resistance.

Tool wear can be classified as two general types; (1) crater wear, wear on the top face (rake) of the tool and (2) flank wear, wear on the primary cutting edge (flank) of the tool. It is generally known in the patent and technical literature that rake wear is primarily chemical wear produced by diffusion between the tool and the hot workpiece chips and flank wear is primarily abrasive wear.

The coated articles of the invention may employ as a base or substrate any hard, solid material to which the coatings will adhere. These hard materials are generally hard metals or alloys thereof, including metal-like alloys, compositions or materials.

The substrates may be cemented carbides and like products of powder metallurgy, as well as hard metal carbides and/or nitrides, etc. and alloys, such as cobalt-chromium-tungsten super alloys and other alloys employed in high speed cutting tools.

In general, sintered materials are preferred as substrates, especially the wear-resistant cemented carbides. Among the many suitable base or substrate materials, cemented tungsten carbide containing from about 5 to 30% of a binder metal of the iron group (cobalt iron, and/or nickel) may be used, and up to a total of 40% of the tungsten carbide content may be replaced by one or more other carbides, including those of titanium, tantalum, nobium, vanadium or chromium. Cemented carbides containing from about 60 to 90% titanium carbide with the balance being nickel or a nickel-molybdenum alloy binder may also be used and up to about half of this titanium carbide may be replaced by titanium nitride.

The substrate bodies are typically coated by chemical vapor deposition techniques or physical vapor deposition techniques. For example, the preferred coatings of titanium carbide and titanium nitride are applied by chemical vapor deposition (CVD). Other techniques available include direct evaporation, sputtering, and like physical techniques.

Useful characteristics of the chemical vapor deposition method include the purity of the deposited layer and the tendency of diffusional interaction between the deposited layers and/or the substrate. For example, a titanium carbide layer is the first preferred layer in the multilayer system of the present invention. This layer is formed on a substrate, or a part thereof, by passing a gaseous mixture of a reactive titanium species, e.g., titanium tetrachloride, a gaseous source of carbon, e.g., methane, and hydrogen gas, over a substrate at a temperature of from about 900° to 1200° C., preferably above about 1000° C. The reaction is described by the following equation and the hydrogen gas is used to maintain a reducing atmosphere:

$$TiCl_4 + CH_4 \rightarrow TiC + 4HCl$$

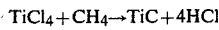

Similarly, the reaction of titanium tetrachloride and nitrogen affords titanium nitride, in accord with the following reaction:

$$TiCl_4 + \tfrac{1}{2}N_2 \rightarrow TiN + 4HCl$$

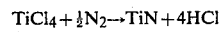

Generally from about 2 to 10 times of the amount required to provide a stoicheometric mixture of nitrogen to titanium is used to ensure a complete reaction.

The gaseous mixture ($CH_4$ or $N_2$) is contacted with the material to be coated i.e., (substrate or coated substrate) for a time sufficient to ensure a coating with the desired degree of thickness. Control of time and reaction temperature, as well as concentration of the reactants, are all within the level of ordinary skill in this art. In the present invention, the coating layers are generally in the range of about 0.1 to 20 microns (um), preferably about 1.0 to 10 microns.

In the process of the present invention a composite coating is formed on the hard metal substrate. The composite coating comprises varying layers of titanium carbide and titanium nitride. In forming the first titanium carbide layer, an interlayer of carbon, titanium, titanium carbide and metal of the substrate is formed which adherently bonds the titanium carbide layer to the substrate. The formation of this interlayer forms a part of the present invention. Some of the carbon needed for TiC formation is taken from the substrate and the balance from the components in the gas-phase.

The general composition of the composite coating formed as described above is illustrated in FIG. 1 wherein the hard metal substrate is illustrated at 10. A ternary intermediate or transition layer 11, is formed by both titanium from the gas phase and metal and carbon from the solid phase, which represents a change in the composition of the surface of the original substrate.

As titanium precipitates from the vapor phase reaction and enters the interlayer 11, a titanium carbide layer 12 forms on the surface of the interlayer. Since the transition from the interlayer to pure titanium carbide is gradual, the precise transition point may be difficult to establish. It should be noted, however, that upon inspection of a section of a substrate coated as described herein, each of the layers 11, and 12 may be observed. Furthermore, while the exact point of transition from one layer to the other is not easily determined, it should be noted that layer 12 is a layer of substantially pure, dense titanium carbide.

A titanium nitride or carbonitride layer 13 is formed adjacent and contiguous with layer 12. The titanium nitride or carbonitride layer is adherently bonded to the titanium carbide layer. As with the initial titanium carbide layer, the transition from pure titanium carbide to pure titanium nitride or carbonitride is gradual. As illustrated an intermediate or transition layer of titanium carbonitride 14 forms at the interface between the first and second layers. It will be appreciated by the skilled artisan that the nature of the intermediate layer will vary depending upon the formation of a pure titanium nitride or titanium carbonitride second layer.

The final titanium carbide layer 15 is formed adjacent and contiguous with layer 13. The titanium carbide layer is adherently bonded to the titanium nitride or carbonitride layer. As with the initial titanium carbide layer, the transition from pure titanium nitride or carbonitride to pure titanium carbide is gradual. As illustrated an intermediate or transition layer of titanium carbonitride 16 forms at the interface between the second and third layers.

EXAMPLE

A number of identical cemented carbide substrates were coated with a variety of coatings and the machining performance of each was determined, see Table 1. The flank wear resistance of the tools coated with the three layer coating of this invention exhibited improved flank wear resistance compared to those tools having an outer TiN coating. Optical microscopic examination showed that all coated inserts with TiN coatings, either singularly or as a component of a multilayer coating, had comparable crater wear resistance while the single layered TiC coating had the lowest crater wear resistance.

While not wishing to be bound by theory, it is believed that hard coatings improve wear resistance primarily because they act as diffusion barriers and secondarily because they have higher abrasive wear resistance (higher hardness) compared to an uncoated substrate.

TABLE 1
FLANK WEAR RESISTANCE EVALUATION OF COATINGS

| Coating | Trial 1<br>Flank Wear (in.) After<br>20 min. Cutting Work-<br>piece Hardness (Rc$^{32}$) | Trial 2<br>Flank Wear (in) After<br>8 min. Cutting Work-<br>piece Hardness (Rc$^{28}$) |
|---|---|---|
| TiC | 0.005 | 0.007 |
| TiC/TiN | 0.008 | 0.009 |
| TiC/TiN/TiC | 0.004 | 0.004 |
| TiC/TiN/TiC | 0.005 | 0.004 |
| TiN/TiC | 0.006 | 0.005 |
| TiCN | 0.009 | 0.007 |
| TiN | 0.011 | 0.008 |

Conditions
Workpiece: AISI 4340 steel (Rc 28-32)
Cutting speed: 400 sfpm - continuous cutting
Feed: 0.015 ipr
Depth of Cut: 0.050 in.
Tool Style: SNG432
Substrate: 6 w/o TaNbC, 3 w/o TiC, 6 w/o Co, Bal. WC

What is claimed is:

1. A coated article for cutting tool and flank wear resistant applications which comprises a hard metal substrate and an abrasion resistant and cratering resistant multilayer coating on at least a portion of said substrate, said coating consisting of:
   (a) a first layer, contiguous with said substrate, and selected from the carbides of metals selected from Titanium, Zirconium, Hafnium, Vanadium, Niobium and Tantalum;
   (b) a second layer, superposed over said first layer, selected from the nitrides or carbonitrides of metals selected from metals selected from Titanium, Zirconium, Hafnium, Vanadium, Niobium and Tantalum; and
   (c) a third layer, superposed over said second layer, selected from the carbides of metals selected from Titanium, Zirconium, Hafnium, Vanadium, Niobium and Tantalum.

2. A coated article for cutting tool insert and flank wear resistant applications as defined in claim 1, in which a transition layer is formed between said second layer and said third layer, the chemical composition of said transition layer varying from the composition of said second layer to the composition of said third layer.

3. A coated article for cutting tool insert and flank wear resistant applications as defined in claim 2, wherein said second layer comprises a metal nitride.

4. A coated article for cutting tool insert and flank wear resistant applications as defined in claim 3, wherein said transition layer comprises a metal carbonitride.

5. A coated article for cutting tool insert and flank wear resistant applications as defined in claim 1, in which a transition layer is formed between said first layer and said second layer, the chemical composition of said transition layer varying from the composition of said first layer to the composition of said second layer.

6. A coated article for cutting tool insert and flank wear resistant applications as defined in claim 5, wherein said second layer comprises a metal carbonitride.

7. A coated article for cutting tool insert and flank wear resistant applications as defined in claim 6, wherein said transition layer comprises a metal carbonitride.

8. A coated article for cutting tool insert and flank wear resistant applications as defined in claim 1, in which a transition layer is formed between said substrate and said first layer, the chemical composition of said transition layer varying from the composition of said substrate to the composition of said first layer.

9. A coated article for cutting tool and wear resistant applications as defined in claim 1, in which the overall thickness of the multilayer coating on said substrate is in the range of from about 0.3 to 15 microns.

10. A coated article for cutting tool and wear resistant applications as defined in claim 1, in which the thickness of the first layer of the coating on said substrate is in the range of from about 0.1 to 5 microns.

11. A coated article for cutting tool and wear resistant applications as defined in claim 1, in which the thickness of the first layer of the coating on said substrate is in the range of from about 1 to 2 microns.

12. A coated article for cutting tool and wear resistant applications as defined in claim 1, in which the thickness of the second layer of the coating on said substrate is in the range of from about 0.1 to 5 microns.

13. A coated article for cutting tool and wear resistant applications as defined in claim 1, in which the thickness of the second layer of the coating on said substrate is in the range of from about 1 to 3 microns.

14. A coated article for cutting tool and wear resistant applications as defined in claim 1, in which the thickness of the third layer of the coating on said substrate is in the range of from about 0.01 to 5 microns.

15. A coated article for cutting tool and wear resistant applications as defined in claim 1, in which the thickness of the third layer of the coating on said substrate is in the range of from about 1 to 3 microns.

* * * * *

UNITED STATES PATENT AND TRADEMARK OFFICE
CERTIFICATE OF CORRECTION

PATENT NO.  : 4,686,156
DATED       : August 11, 1987
INVENTOR(S) : J. Gary Baldoni and Charles D'Angelo It is certified that error appears in the above-identified patent and that said Letters Patent are hereby corrected as shown below:

Title page:

Item [73], change Assignee: from "GTE Service Corporation" to --GTE Laboratories Incorporated--.

Signed and Sealed this

Fifteenth Day of December, 1987

Attest:

DONALD J. QUIGG

*Attesting Officer*      *Commissioner of Patents and Trademarks*